Patented Mar. 17, 1931

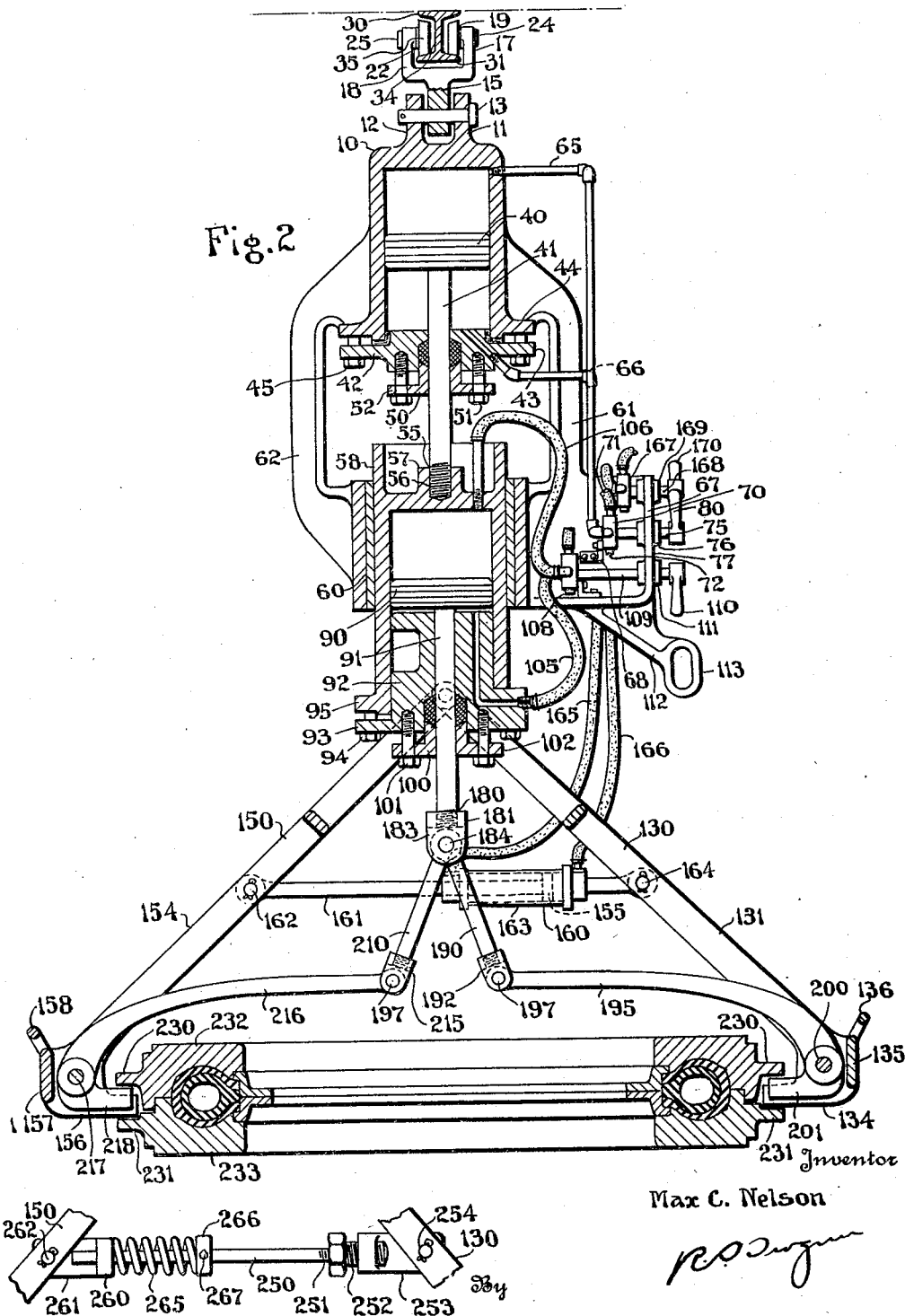

1,797,176

UNITED STATES PATENT OFFICE

MAX C. NELSON, OF AKRON, OHIO, ASSIGNOR TO THE GOODYEAR TIRE & RUBBER COMPANY, OF AKRON, OHIO, A CORPORATION OF OHIO

MOLD BREAKING AND TRANSPORTING DEVICE

Application filed December 15, 1928. Serial No. 326,370.

This invention relates to apparatus for handling sectional tire molds and it has particular relation to apparatus of the above designated character which shall be especially applicable for transporting the molds and separating the sections thereof.

An object of the invention is to provide apparatus for separating the sections of a tire mold following the vulcanization of a tire therein.

Another object of the invention is to provide apparatus for transporting the entire mold or a section thereof.

Heretofore, following the vulcanization of a tire in a mold composed of upper and lower sections, it has been the practice to separate the sections in order to remove the tire, by a manual operation comprising the insertion of one end of an elongate bar into an opening between the sections along their inner peripheries, and thereafter fulcruming the bar on the lower section and prying the upper section away therefrom. This operation required considerable manual force and, in addition, the services of more than one workman in order that the mold would not be displaced accidentally during the separation of the sections. Transportation of the mold or a section thereof was effected by various types of hoisting devices which are well known and hence need not be described.

This invention has for one of its purposes obviation of the manual operation of separating the molds in the afore-described manner, and employment of mechanical means instead. One embodiment of the invention contemplates the use of members pivoted to the cylinder of a fluid reciprocatory motor, which members have hook portions on their lower ends adapted to engage opposite sides of the mold between flanges on the respective sections thereof. Other members, pivotally connected to the piston rod of the motor, also are provided with hook portions pivoted to the hook portions on the first mentioned members and likewise projecting between the flanges on the mold. Movement of the piston rod causes a movement of the hook portions of the members relatively about their pivots and hence, engagement respectively of the hook portions and the flanges of the mold, thereby separating the sections. In addition, the invention contemplates the use of a second motor supported on a tramway, whose piston rod is connected to the cylinder of the first motor, whereby the mold or a section thereof may be transported from one place to another.

For a better understanding of the invention, reference may now be had to the accompanying drawings, forming a part of the specification, in which:

Fig. 2 is a cross-sectional view of the construction shown by Fig. 1, as taken substantially along line II—II thereof; and Fig. 3 illustrates a modified form of resilient connection between certain of the mold engaging members.

Figure 1:
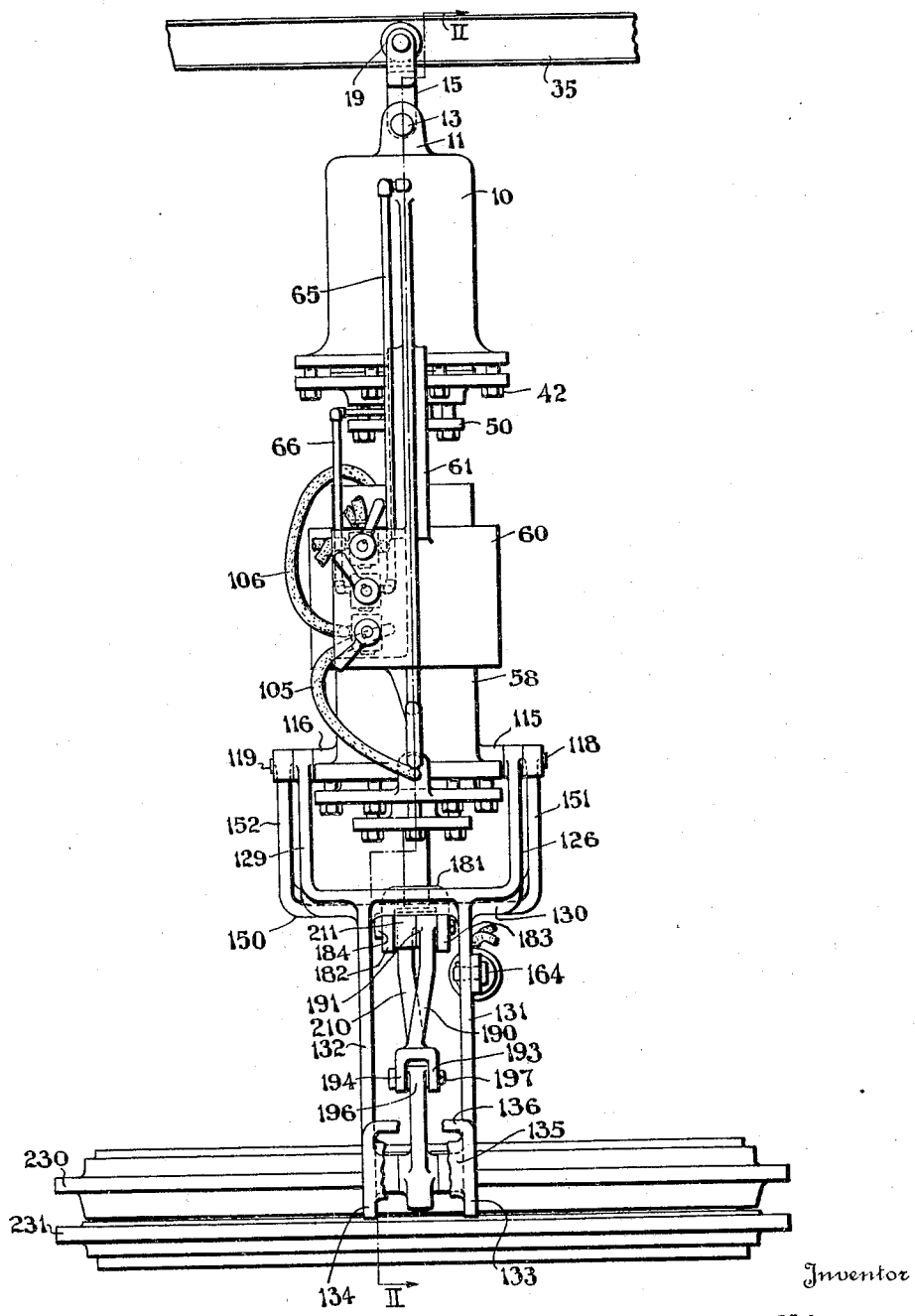
Fig. 1 is an elevational view of a device constructed according to one embodiment of the invention.

Referring to Fig. 2, a cylinder 10, having an apertured pair of ears 11 and 12 projecting from its upper end, is pivotally connected by a pin 13 to a suspension member 15. The upper end of the member 15 is enlarged and bifurcated to provide a pair of upwardly extening arms 17 and 18, in the upper ends of which conically faced rollers 19 and 22 are rotatably supported by pins 24 and 25. These rollers are disposed between upper and lower flanges 30 and 31 and on opposite sides of a web 34 of an I-beam or tramway 35, which is secured in any suitable manner to the ceiling of a building.

The cylinder 10 is provided with a piston 40 and piston rod 41, the latter of which projects through a head 42, secured to the lower end of the cylinder by a plurality of bolts 45 projecting through openings in a flange 43 on the head and engaging a similar flange 44 on the cylinder. A stuffing box 50, through which the piston rod also projects, is in turn secured to the head by bolts 51 that project through a flange 52 on the former and engage the latter. The lower end of the piston rod is threaded, as indicated at 55, and engages a threaded opening 56 in a boss 57 integral with a second cylinder 58. The latter is slidably supported in a bearing 60 provided between the lower ends of a pair of vertically disposed arms 61 and 62 which, at their upper ends, are integral with the cylinder 10.

Fluid under pressure is admitted to and discharged from the cylinder 10, by a pair of conduits 65 and 66 connected, respectively, to the upper and lower ends of the cylinder. These conduits in turn are connected to a four-way valve 70 which is supported on an angle bracket 68 supported by a laterally extending portion 67 of the arm 61. This valve, which also is connected to a fluid pressure supply conduit 71 and a discharge conduit 72, is operated by a rotatable rod 75 that projects through a boss bearing 76 formed in a flange 77 on the arm 67. Operation of the rod 75 is facilitated by a handle 80 secured to its outer end.

Like the cylinder 10, the clyinder 58 is provided with a piston 90 and a piston rod 91, the latter of which projects through a cylinder head 92 having an apertured flange 93, secured by bolts 94 to the cylinder, which bolts project through the apertures in the flange and engage a flange 95 on the cylinder. The piston rod also is provided with a stuffing box 100 secured to the cylinder head 92, by bolts 101 projecting through an apertured flange 102 on the box and engaging the cylinder head. Conduits 105 and 106, communicating with the lower and upper ends of the cylinder 58 are, in turn, connected to a four-way valve 108, identical with the aforementioned valve 70, and which is operable by a rod 109 pivotally supported in a boss 111 in the flange 77 and having a handle 110 on its outer end. Below this valve and rod, the laterally projecting portion 67 of the arm 61 is provided with an offset portion 112 having a handle 113 formed in its lower end for facilitating movement of the aforedescribed construction on the tramway.

As best shown by Fig. 1, the cylinder 58, on diametrically opposed sides, is provided with bosses 115 and 116 into which pins 118 and 119 respectively are threaded. These pins pivotally support a bifurcated member 130 having upwardly projecting arms 126 and 129 provided with apertures in their upper ends engaging the pins. The member 130 extends downwardly and obliquely to the vertical plane in which the cylinder 68 is disposed, and is provided with a pair of spaced arms 131 and 132 directed inwardly at their lower ends to provide hook portions 133 and 134. The latter portions are connected adjacent their ends by an integral reinforcing bar 135, provided with a handle 136 for facilitating movement of the member 130. As best shown by Fig. 2, the hook portions 133 and 134 project between spaced flanges 230 and 231 formed on the outer periphery of upper and lower sections 232 and 233 of a tire mold.

A second bifurcated arm 150, extending downwardly and oppositely to the arm 130, also is provided with a pair of arms 151 and 152 disposed outwardly of the arms 126 and 129 and provided with apertured upper ends engaging the aforesaid pins 118 and 119 Like the arm 130, the arm 150 is provided with a pair of depending arms 154 which are curved inwardly toward the arms 133 and 134 to provide a pair of hook portions 156. These hook portions also project between the flanges 230 and 231 on the mold but on the side thereof opposite the portions 133 and 134. The lower ends of the arms 154 are reinforced by a connecting bar 157, which is provided with a handle 158 similar to the handle 136 on the member 135.

The arms 130 and 150 are yieldingly connected together intermediate their ends by a piston and cylinder device 160 comprising a rod 161 pivoted at one end 162 to the arm 154 and having a piston 155 on its other end, which piston is slidably mounted within a cylinder 163 pivoted to the arms 131 and 132, as indicated at 164. Opposite ends of the cylinder 163 are connected by conduits 165 and 166 to a four-way valve 167 mounted on the laterally extending portion 67 of the arm 61. Like the valve 72 and 108, the valve 167 is provided with an operating rod 168 rotatably mounted in a boss 169 on the frame portion 67, which rod is provided with an operating handle 170. It is evident when fluid under pressure is admitted into the end of the cylinder 163 adjacent the arm 150, that the piston 155 will be moved toward the other end of the cylinder and hence, the arms 130 and 150 forcefully moved towards each other, thus causing the hook portions at their lower ends to engage the mold firmly. On the other hand, when fluid under pressure is admitted into the opposite end of the cylinder, the arms 130 and 150 will be moved farther apart, thus causing the hook portions on their lower ends to be disengaged from the mold.

The lower end of the piston rod 91 is threaded, as indicated at 180, and engages a bifurcated coupling 181 having depending apertured ears 182 and 183 through which a pin 184 projects. A rod 190 is provided with an eye 191 at its upper end pivotally mounted on the pin 184 adjacent the ear 182, while its other end is threaded into a bifurcated coupling 192 having depending apertured ears 193 and 194. In turn an arcuate arm 195, provided with an eye 196 at its upper end, is pivoted on a pin 197 extending through the apertures in the ears 193 and 194, while its opposite end extends between the lower ends of the arms 131 and 132 and is pivotally secured therebetween by a pin 200 projecting through all of these arms. Like the arms 131 and 132, the arm 193 beyond the pivot 200, is provided with a hook portion 201, extending substantially in parallel relation to the hook portions 133 and 134 of the former, between the flanges 230 and 231 on the mold.

The pin 184 also pivotally supports a depending rod 210 having an eye 211 at its upper end through which the pin projects. The lower end of the rod 210 is threaded to engage a bifurcated coupling 215 which, like the coupling 192, is pivotally secured to an arcuate arm 216 similar to the arm 195 but extending in a direction opposite thereto. The lower end of the arm 216 is pivoted between the lower ends of the arms 154 by a pin 217 which extends through apertures in all three arms. Beyond the pivot 217, the arm 216 is directed inwardly to provide a hook portion 218 which, like the hook portions 156, is disposed between the flanges 230 and 231 of the mold.

An alternative means for connecting the arms 130 and 150, which is illustrated by Fig. 3, comprises a rod 250 threaded at one end as indicated at 251, into an internally threaded screw 252, the latter of which in turn is threaded into a coupling 253 pivoted to the arm 130, as indicated at 254. The other end of the rod 250 projects through an apertured flange 260 of a bracket 261, pivotally secured to the arm 150, as indicated at 262. A spring 265, encircling the rod 250 and secured at opposite ends to the flange 260 and to a collar 266 rigidly fastened by a set screw 267 on the rod, provides a resilient connection between the arms 130 and 150.

In operation of the above described mechanism, assuming that a tire in the mold has been vulcanized and it is desired to separate the sections 232 and 233 of the mold, fluid under pressure is admitted into the conduit 105 by operation of the handle 110 and consequently the valve 108, which results in movement of the piston 90 upwardly and the arms 195 and 216 about their pivots 200 and 217, respectively. This causes the hook portions 201 and 218 of the arms 195 and 216 respectively, to engage forcibly the flange 230 on the upper section 232 of the mold, while, at the same time, the hook portions 133, 134 and 156 on the arms 131, 132 and 154, respectively, engage the flange 231 on the lower section 233 of the mold. Consequently, the upper section of the mold is separated from the lower section thereof. If it is desired to transport the upper section 232 to a different position, the handle 80 is turned thereby operating the valve 70, to admit fluid under pressure into the lower end of the cylinder 10, which results in a bodily movement of the cylinder 58 and the parts of the mechanism connecting it to the upper section 232 of the mold. Thereafter, the entire mechanism may be moved along the tramway 30, the handle 113 serving to facilitate this movement. Release of the hook portions 133, 134, 201, 156 and 218 from the flange 230 is effected by operation of the valve 167 to admit fluid under pressure through the conduit 166, thus causing the fluid cylinder device 160 to separate further the arms 130 and 150. It is, of course, to be understood that when another mold is to be separated, it is only necessary to operate the valves 70 and 108 to lower the cylinder 58 and the piston 90 therein, whereafter by admitting fluid under pressure into the conduit 165 and the cylinder 163, the arms 130 and 150 will be moved toward each other and the aforementioned hook portions brought into engagement with the mold between the flanges thereof.

From the foregoing description, it is apparent that a simple and effective device has been provided for separating the upper and lower sections of a tire mold following the vulcanization of a tire therein. It is also apparent that the device may easily be engaged with a mold for the purpose of separating the sections thereof as well as quickly releasing them therefrom following the separating operation. Moreover, it is apparent that a device has been provided for transporting either the assembled mold or a section thereof from one position to another.

Although I have illustrated only the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. A device for separating sectional molds comprising a plurality of members adapted to straddle the mold with their ends engaging a section thereof, means pivoted to the members and adapted to engage another section of the mold, and means for moving said means and members relatively.

2. A device for separating sectional molds comprising a plurality of members adapted to be disposed at spaced positions about the mold and to engage a section thereof, means pivoted to each of the members and adapted to engage another section of the mold, and means for moving said means and members relatively.

3. In combination, a motor, one or more members pivotally connected to a stationary part of the motor and having means for engaging a section of a sectional mold, and one or more members pivoted respectively to the first mentioned members and having means for engaging another section of the mold, the last mentioned members being operatively connected to a movable part of the motor.

4. In combination, a motor, a plurality of members connected to a stationary part of the motor and having means for engaging opposite sides of a section of a mold, a plurality of other members operatively connected to a movable part of the motor and having means for engaging another section of the mold, and resilient means connecting the first mentioned members of one set.

5. In combination, a reciprocatory motor comprising a cylinder, a piston therein and a piston rod extending through an end of the cylinder, a pair of members pivoted to the cylinder and extending in spaced relation therefrom, said members having means adjacent their free ends for engaging a section of a mold, a pair of members operatively pivoted to the piston rod and having means for engaging another section of the mold, the free ends of the members pivoted to the cylinder being movably connected respectively to the free ends of the members pivoted to the piston rod.

6. In combination, a reciprocatory motor comprising a cylinder, a piston therein, and a piston rod extending through an end of the cylinder, a pair of members pivoted to the cylinder and extending therefrom in spaced relation, the lower ends of the members having hook portions adapted to engage a section of a mold, a pair of members operatively pivoted to the piston rod and also pivoted to the first mentioned members respectively, said second pair of members having hook portions adapted to engage another section of the mold.

7. In combination, a reciprocatory motor comprising a cylinder, a piston therein, and a piston rod extending through an end of the cylinder, a pair of members pivoted to the cylinder and extending therefrom in spaced relation, the lower ends of the members having hook portions adapted to engage a section of a mold, a pair of members operatively pivoted to the piston rod and also pivoted to the first mentioned members respectively, said second pair of members having hook portions adapted to engage another section of the mold, the members of the first set being resiliently connected.

8. In combination, a suspended reciprocatory motor comprising a cylinder, a piston and piston rod, a like motor connected to the piston rod of the first, a pair of members connected to the cylinder of the second motor and having means for engaging a section of a mold, and a pair of arms pivotally connected to the piston rod of the second motor and also pivotally connected to the first mentioned arms respectively, said arms having means for engaging another section of the mold.

9. In combination, a motor, a plurality of members connected to a stationary part of the motor and having means for engaging opposite sides of a section of a mold, a plurality of other members operatively connected to a movable part of the motor and having means for engaging another section of the mold, and resilient means connecting the first mentioned members.

10. A device for separating the sections of a mold, comprising a plurality of arms movably secured to a stationary member and having portions adapted for engaging one section of the mold, a plurality of arms operatively and movably connected to the first mentioned arms and adapted for engaging the other section of the mold, and means connected to the second group of arms for moving them with respect to the first mentioned group of arms.

In witness whereof, I have hereunto signed my name.

Signed at Akron, in the county of Summit and State of Ohio, U. S. A., this 14th day of December, 1928.

MAX C. NELSON.